D. M. DEARING.
RUNNING GEAR FOR MOTOR VEHICLES.
APPLICATION FILED JAN. 16, 1913.
1,120,036.
Patented Dec. 8, 1914.
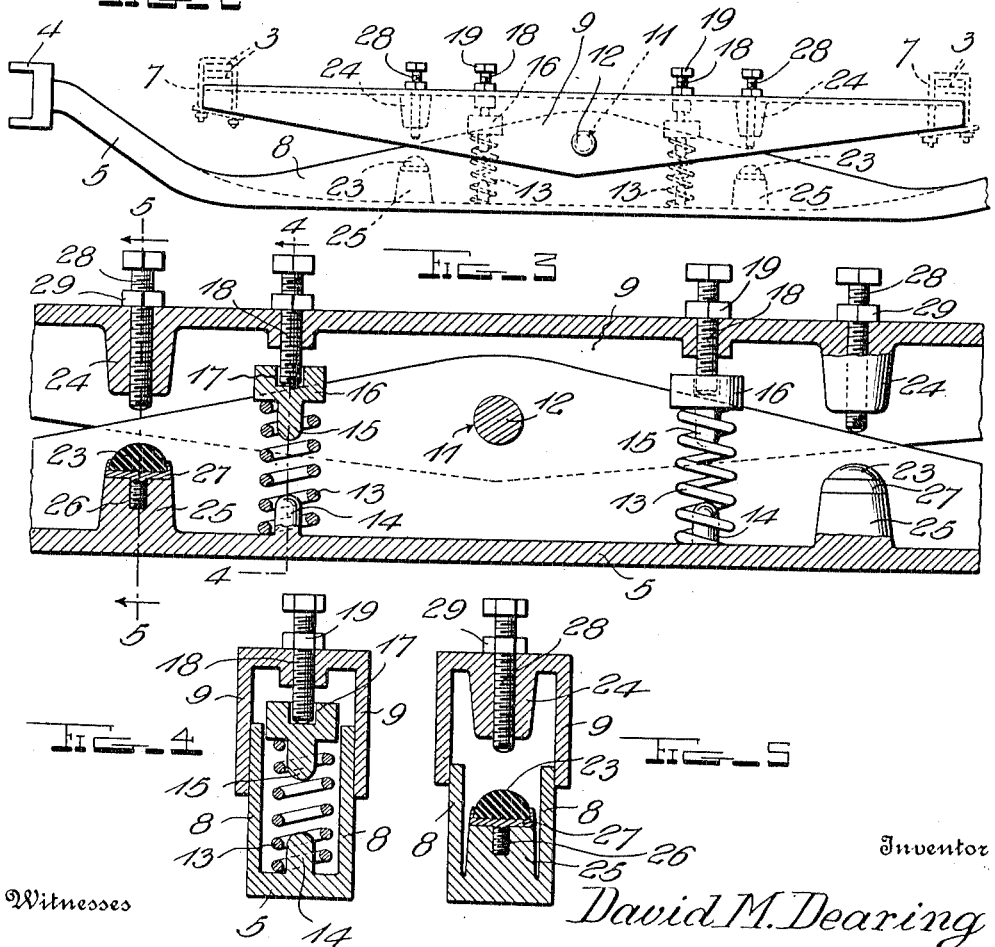

UNITED STATES PATENT OFFICE.

DAVID M. DEARING, OF JACKSON, MICHIGAN.

RUNNING-GEAR FOR MOTOR-VEHICLES.

1,120,036.  Specification of Letters Patent.  Patented Dec. 8, 1914.

Application filed January 16, 1913. Serial No. 742,431.

*To all whom it may concern:*

Be it known that I, DAVID M. DEARING, a citizen of the United States, residing at Jackson, in the county of Jackson and State of Michigan, have invented certain new and useful Improvements in Running-Gear for Motor-Vehicles; and I do declare the following to be a full, clear, and exact description of the invention, such as will enable others skilled in the art to which it appertains to make and use the same.

This invention relates to motor vehicle frame structure, and more especially to the running gear thereof; and the object of the same is to interpose between the body and the front axle and pivot to the latter a peculiar form of bolster which sustains the body through the instrumentality of the springs and holds it substantially level although the front axle may cant by reason of inequalities in the roadway. It is to be understood that this device forms one element of a so-called three point system of suspending or supporting the automobile body on the running gear—the other two points being where the rear corners of the frame are sustained on the rear springs above the rear axle.

The present invention consists in the details of construction which will be hereinafter more fully described and claimed, and as shown in the drawings wherein—

Figure 1 is a front elevation of an automobile whose axle is provided with this invention. Fig. 2 is an enlarged detail in front elevation, showing the axle and bolster. Fig. 3 is a still further enlarged detail, being a vertical longitudinal sectional view through the center of the axle and the center of the bolster. Figs. 4 and 5 are cross sectional views on the lines 4—4 and 5—5 respectively of Fig. 3.

The present invention is an improvement on my prior patent dated May 21, 1912, and bearing Number 1,026,851, and its main feature of improvement thereover is that the dropped and webbed front axle itself constitutes the lower member and the channeled bolster itself constitutes the upper member of a support or running gear upon which the automobile body is mounted at its front end. In addition the present case includes improvements in the details of the balancing springs and their adjustment, and adds a buffer or shock absorber.

The automobile body B is mounted on a framework whereof I am concerned only with the front cross bar 1 and the side bars 2, the latter supported at the front corners of the frame upon three-quarter or half-elliptical springs 3 in any well known manner. The front wheels W have stub shafts mounted in yokes 4 at the outer ends of a dropped axle 5, the latter being by preference a drop forging of sufficient strength for the weight superimposed upon it and purposely dropped at its center so that the center of gravity of the superstructure will be brought as low as possible. In cross section the axle 5 is substantially U-shaped, the upright webs 8 which rise from its sides serving as trusses to give this axle great strength, and by preference these webs spring from points where the axle begins to turn upward toward the yokes 4, and their upper edges rise gradually thence to the center of the axle as shown. The bolster 6 to which the springs 3 are connected by clips 7, is by preference also of U-shape in cross section, but inverted and its webs 9 spaced slightly farther apart than the webs 8 of the axle 5 so that the latter which is the lower member may pass inside the former which is the upper member as seen in Figs. 4 and 5. Again, the webs 9 which begin at the extremities of the channeled bar or bolster 6, grow gradually wider or deeper to a central point as seen in Fig. 2 and serve in the nature of trusses to give strength to this member. These webs as well as the webs 8 are pierced with alined holes 11, through which is passed a bolt or pivot 12 forming the sole means for supporting the upper member 6 upon the lower member 5.

At opposite sides of the central pivot I dispose expansive balancing or shock-absorbing springs 13 so that the two members of this improved axle or running gear will be caused to stand ordinarily in substantial parallelism; but here the similarity with my former patent above referred to ends.

The lower end of each spring is mounted loosely around a lug or projection 14 rising from the axle 5, and its upper end incloses a similar lug or projection 15 formed at the bottom of a spring-cap 16 which has a socket 17 in its upper end. In this socket rests the tip of a set screw 18 which is threaded downward through the channeled bar or upper member 6, and held in place by a jam nut 19. The two balancing or shock-absorbing springs 13 as thus mounted are disposed on opposite sides of the pivot 12 and not very far distant therefrom as seen in Fig. 2, and in practice I would tighten up the set screws 18 until each spring was under considerable tension although the tension of the two springs should be substantially the same so that the body B of the automobile will stand balanced and level. The possibility of increasing the tension of one spring without correspondingly lessening that of the other is of advantage in cases wherein one of the main springs 3 has become weak from any reason or one side of the body B runs low for any reason—due usually to the weight of the driver, especially if he be quite heavy. In adjusting the shock absorbing springs (which in that case would of course become balancing springs) to overcome or offset such weakness on the part of one of the main springs 3, care should be taken to level the body B with due regard to the weight to be thrown onto it when the driver takes his seat.

Outside the balancing or shock-absorbing spring 13 just described are bumpers, whereof each is illustrated as consisting of a rubber plug 23 mounted in a cup 27 having a threaded pendant shank 26 which screws into a boss 24 rising from the lower member or axle 5, and a set screw 28 passing down through the upper member 6 and a boss 25 formed beneath it between its webs 9, and held in place by a jam nut 29. The tip of the set screw 28 should be spaced some distance from the top of the plug 23 as shown in Fig. 3, and the two set screws should be so set that they will not contact with the bumper plugs until either the axle has been canted to an excessive degree with respect to the bolster, the bolster has been canted excessively with respect to the axle, or one member has been canted upward and the other downward at the same side of the machine. In any of these three cases the bumper at that side comes into play and relieves the spring 13 at that side of extreme compression which might tend to snap it. Even then, however, the upper member or bolster 6 is supported yieldingly from the lower member or axle 5 by the rubber plug, and the body B is spring-supported as at 3 upon the ends of the bolster just as it is in ordinary constructions where the springs are connected directly with the dropped axle. As this contingency will but rarely occur, it follows that under ordinary circumstances the body B is spring supported upon the bolster and the latter pivotally supported upon the axle and spring supported or cushioned against the rocking movement of said axle as the wheels pass over uneven ground. The result will be that the driver or passenger in an automobile equipped with this form of running gear will find that it rides with extreme ease, and whatever is comfortable to the passenger is easy on the engine which therefore has longer life, and also easier on the frame structure—especially if the latter be built on the three point system as suggested above.

From the foregoing description it will be seen that the upper ends of all the adjacent screws project beyond the upper surface of the bolster, whereby the same can be conveniently adjusted.

I do not wish to be limited to details, nor to the materials or proportions of parts.

What is claimed as new is:

1. The combination with the front axle and body of a vehicle, of a bolster centrally pivoted to said axle with its opposite ends disconnected from the latter, two balancing expansion springs mounted upon the axle, yielding buffers also mounted upon the axle beyond the springs, screws carried by the bolster having their upper ends projecting beyond the upper surface of the same, and with their lower ends in connection with said springs, additional set screws also carried by the bolster over said buffers, the lower ends of which are normally out of contact with the buffers, but adapted to contact therewith, said last named set screws also having their upper ends projecting above the upper surface of the bolster and in alinement with the first named set screws, whereby the projecting upper ends of the various set screws are exposed beyond the front end of the body of the vehicle and adapted to be conveniently adjusted.

2. The combination with the front axle and body of a vehicle; of a bolster centrally pivoted to said axle with its opposite ends disconnected from the latter and supporting said body, adjustable yielding means between said axle and bolster on opposite sides of the pivotal point therebetween, yielding buffers removably mounted on the axle on opposite sides of the pivotal point and beyond said yielding means, set screws carried by the bolster over said buffers having the lower free ends thereof normally spaced from the buffers, the lower ends of said set screws being adapted to contact with said buffers upon the pivotal movement of the bolster with respect to the axle, and means to lock said set screws in the bolster in any adjusted position with respect to said buffers.

In testimony whereof I have hereunto set my hand in presence of two subscribing witnesses.

DAVID M. DEARING.

Witnesses:
FRANK H. SPAULDING,
JOHN McDEVITT.